United States Patent [19]
Schmid-Doernte

[11] Patent Number: 6,064,028
[45] Date of Patent: May 16, 2000

[54] RESISTANCE FORGE WELDING MACHINE

[75] Inventor: Juergen Schmid-Doernte, Schwifting, Germany

[73] Assignee: Messer Griesheim Schweisstechnik GmbH & Co., Germany

[21] Appl. No.: 09/146,594

[22] Filed: Sep. 3, 1998

[30] Foreign Application Priority Data

Sep. 4, 1997 [DE] Germany ............................ 197 38 647

[51] Int. Cl.$^7$ ............................ B23K 9/12; B23K 37/047; B23K 37/02
[52] U.S. Cl. .................................... 219/86.41; 219/86.51; 219/86.7
[58] Field of Search ............................ 219/86.41, 86.51, 219/86.7

[56] References Cited

U.S. PATENT DOCUMENTS

| | | | |
|---|---|---|---|
| 5,225,647 | 7/1993 | Dufrenne | 219/86.51 |
| 5,340,960 | 8/1994 | Takasaki et al. | 219/86.7 |
| 5,386,092 | 1/1995 | Dufrenne | 219/86.51 |
| 5,484,975 | 1/1996 | Itatsu | 219/86.7 |
| 5,528,011 | 6/1996 | Kono et al. | 219/86.41 |
| 5,582,747 | 12/1996 | Sakai et al. | 219/86.41 |
| 5,898,285 | 4/1999 | Nagasawa et al. | 318/568.13 |

*Primary Examiner*—Patrick Ryan
*Assistant Examiner*—Anjan Dey
*Attorney, Agent, or Firm*—Connolly Bove Lodge & Hurtz LLP

[57] ABSTRACT

In resistance forge welding, the heat for the welding point is produced by simultaneous action of an electrical current and the force of the electrode as well as the electrical resistance of the materials to be welded in the region of the point of contact of the electrodes. The workpieces generally lie flat on each other and are welded under considerable pressure at individual points by the force of the electrode. The current and the electrode force are supplied via the electrodes.

In order to increase the controllability and dynamics of the electrode movement, according to the invention a controllable electromotive drive (13), which has a drive spindle (16) or a toothed rack, is used.

5 Claims, 3 Drawing Sheets

$X_1$ = Positioning displacement by means of position control (infeed travel) Mmax.
$X_2$ = Position of the workpiece, advancement by means of torque control and with force limitation
$\Delta X$ = Moving-on displacement in the welding process
$X_E$ = Max. displacement (50mm)

RESISTANCE FORGE WELDING MACHINE

This application is related to DE 197 38 647.4 filed on Sep. 4, 1997, which is incorporated by reference in its entirety for all purposes.

BACKGROUND OF THE INVENTION

The invention relates to a resistance forge welding machine, comprising at least one welding head with an electrode, at least one welding transformer for generating a welding current, which is connected to the electrode, at least one drive for moving the electrode or for producing electrode pressure on the workpiece and a controller, which is connected to the drive and to the welding transformer.

In resistance forge welding, the heat for the welding point is produced by simultaneous action of an electrical current and the force of the electrode as well as the electrical resistance of the materials to be welded in the region of the point of contact of the electrodes. The workpieces generally lie flat on each other and are welded under considerable pressure at individual points by the force of the electrode. The current and the electrode force are supplied via the electrodes.

Known resistance forge welding machines are designed as single-phase or multi-phase machines. The actuation (advancement) of the movable electrode and the application of the electrode pressure to the workpiece take place by means of pneumatic cylinders. Only in rare cases are other drives, such as for example hydraulic cylinders and mechanical adjusting means (for example camshafts), used for applying the electrode force.

In addition, industrial robots are used as carriers of movable welding tools and welding tongs and are moved according to a fixed and stored program from point to point in a series of directions along the edges to be welded of the parts to be joined. At each intended welding point, the welding tongs are made to carry out spot welding by a control pulse. Industrial robots for resistance forge welding comprise a column and an arm. Fastened at the end of the arm by means of a suitable fastening flange is the welding tool or the welding tongs. To move to a particular point of the workpiece to be welded, the welding tongs are initially moved to the coordinates X, Y, Z of the point. Since, at every point, electrodes have to be arranged in a position perpendicular to the workpiece surface, two to three further movements are necessary for the welding tongs by rotating, turning etc. As a result, the kinematics of the industrial robots must allow adjustment with 5 to 7 degrees of freedom.

These movements, carried out electromotively, hydraulically or pneumatically, are initiated by a programmed controller for each welding point.

In the case of the known resistance forge welding devices, the control means for the electrode force is separate from the means for producing the electrode travel. A highly accurate movement or positioning of the electrodes and the electrode force under open-loop or closed-loop control in dependence on the respective position would be desirable, however.

SUMMARY OF INVENTION

The invention is based on the object of providing a resistance forge welding machine in which the controllability and dynamics of the electrode movement and of the electrode pressure are improved.

The use of a controllable electromotive drive, in particular a servo motor, which has a drive spindle or a toothed rack, increases the speed, dynamics, controllability, precision and reproducibility, and consequently the reliability of the process. The control means for the electrode force and for moving the electrode (advancement) is operated by means of a single drive, which is controlled by a controller which uses open-loop or closed-loop control to control the welding voltage or the welding current, or the welding performance and/or the temperature of the welding process. The servo drive can be controlled with high precision on the basis of torque, speed and position. Digital, integrated measuring systems, such as displacement and rotational-speed/torque sensors, in the drive allow precisions of $1/4000$ of a revolution to $1/400000$ of a revolution. The use of electrical servo drives for the welding head infeed spindle permits high precision and digital controllability during resistance forge welding, which increases reproducibility and reliability of the process. The virtually free controllability together with the control of the resistance forge welding machine combined with special current programs allow new possibilities to be opened up in welding technology, safeguarding of the process and the cycle time for resistance forge welding machines. The welding head spindle can be numerically activated and consequently can be integrated into the existing closed-loop control of the welding current control device.

The drive advantageously has a displacement sensor and/or torque sensor, which are respectively connected to a comparator. It is advantageous that it is possible in principle to dispense with externally built-on actual-value sensors. The precision and dynamics of the control loop are improved, costs are reduced.

The fact that the comparisons for the setpoint/actual-value comparison are provided, or arranged, in the controller or the drive means that it is possible to dispense with separate displacement or torque sensors. Consequently, the operating range of the resistance forge welding machine is increased and the risks of collision are reduced.

Thus, setpoint displacement or torque values can be input to the comparators via setpoint generators. Analog and parallel/serial digital setpoint interfaces may be provided as setpoint generators. Manual potentiometers, incremental transducers, setpoint generation from higher-level control systems.

High precision and reproducibility along with greater speed are achieved by means of a setpoint/actual-value comparison.

The arrangement of the drive and the drive spindle parallel to one another, the force of the drive being transmitted to the drive spindle via a belt, a gear mechanism, and a diaphragm coupling or finger coupling, allow a particularly compact structural unit to be created.

THE DRAWINGS

FIG. 1 shows a diagrammatic representation of the resistance forge welding machine according to the invention FIG. 2 shows a diagrammatic representation of the parallel arrangement of the drive and the drive spindle FIG. 3 shows a program profile for the electrical welding drive.

DETAILED DESCRIPTION

Figure 1:
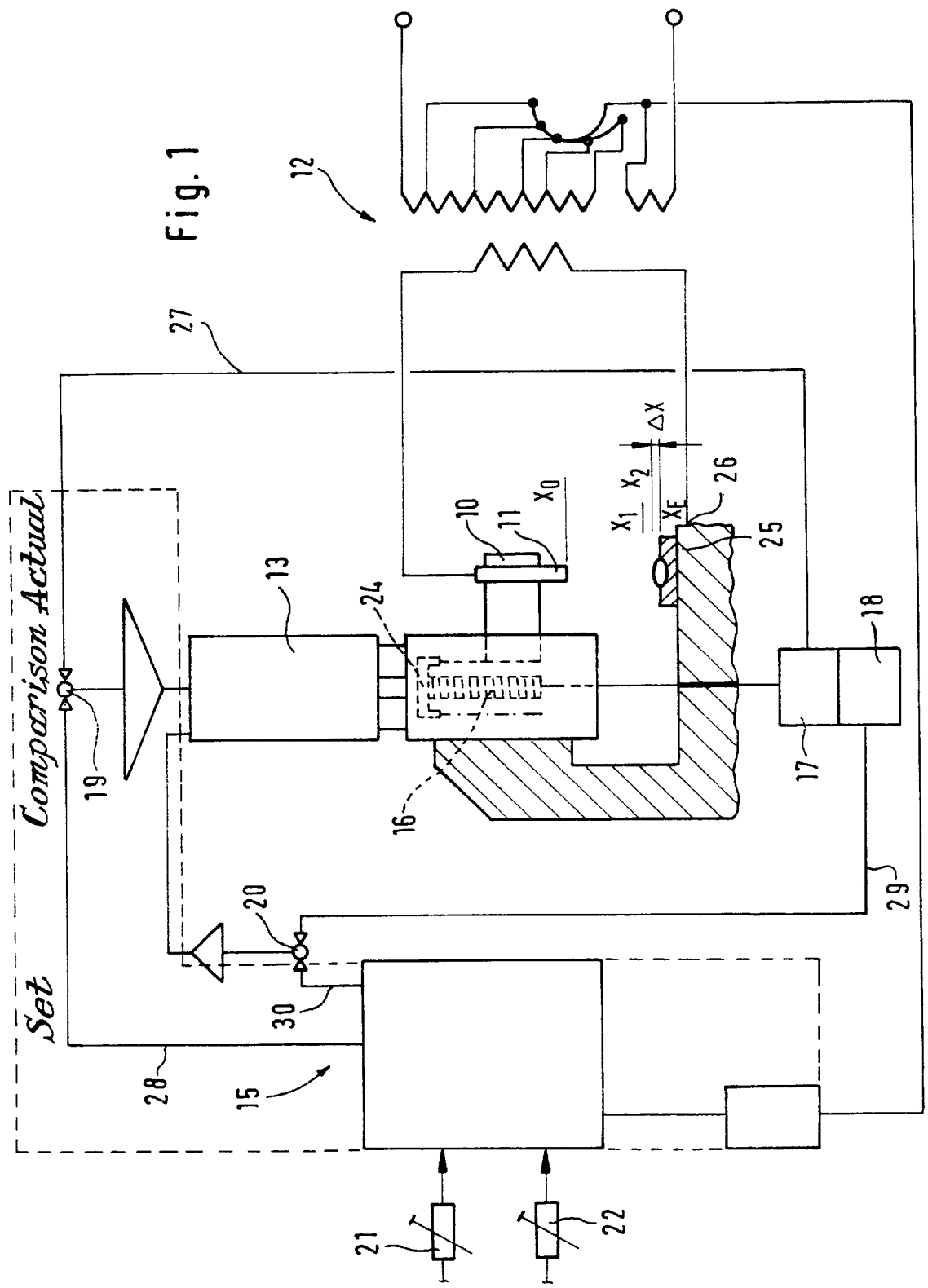

Diagrammatically represented in FIG. 1 is a resistance forge welding machine which essentially comprises at least one welding head 10 as the carrier of an electrode 11, at least one welding transformer 12 for generating a welding current, which is connected to the electrode 11 via terminal 24 and is connected to counter electrode 25 via terminal 26, at least one drive 13 for moving the electrode 11 and for producing an electrode pressure on the workpiece 14, and a controller 15, which is connected to the drive 13 and to the welding transformer 12.

The drive 13 is preferably designed as a linear motor or AC/DC servo motor, which is connected to the welding head 10 via coupling element 24 and drive spindle 16 in such a way that, when the drive 13 is in operation, the welding head 10 can be moved into a predetermined position.

In the case of the servo motor 13, the rotor movement takes place in small, definite angular steps. These are controlled by a series of electrical pulses, which are passed to the stator windings via an integrated control device or the controller 15. The angle of rotor rotation corresponds to the number of pulses given and the rotational speed corresponds to the pulse frequency.

The servo motor has a displacement sensor 17, by means of which the displacement predetermined by the controller 15 is sensed and an actual-value signal corresponding to the displacement sensed is fed to the comparator 19 via line 27. The comparator 19 receives a setpoint signal via controller 15 and line 28. If there is a deviation between the actual-value signal and the setpoint signal, the drive 13 is actuated until the setpoint signal corresponds to the actual-value signal.

The drive 13 also has a torque sensor 18, which is connected to a comparator 20 via line 29. In the torque sensor 18, a torque value of the drive spindle 16 or of the rotor of the drive 13 is sensed and is fed to the comparator as an actual-value signal. The comparator 20 receives a setpoint signal from the controller 15 via line 30, compares the setpoint signal with the actual-value signal and, if there are any deviations of the torque value, corrects the latter to the predetermined torque value. Setpoint generators 21, 22 for the input of setpoint values are provided at the controller. Magnetic tapes, floppy disks, scanners and, similarly, teach-in control devices may be used as setpoint generators. The comparators 19 and 20 are provided in the controller 15 or in the drive 13.

Figure 2:
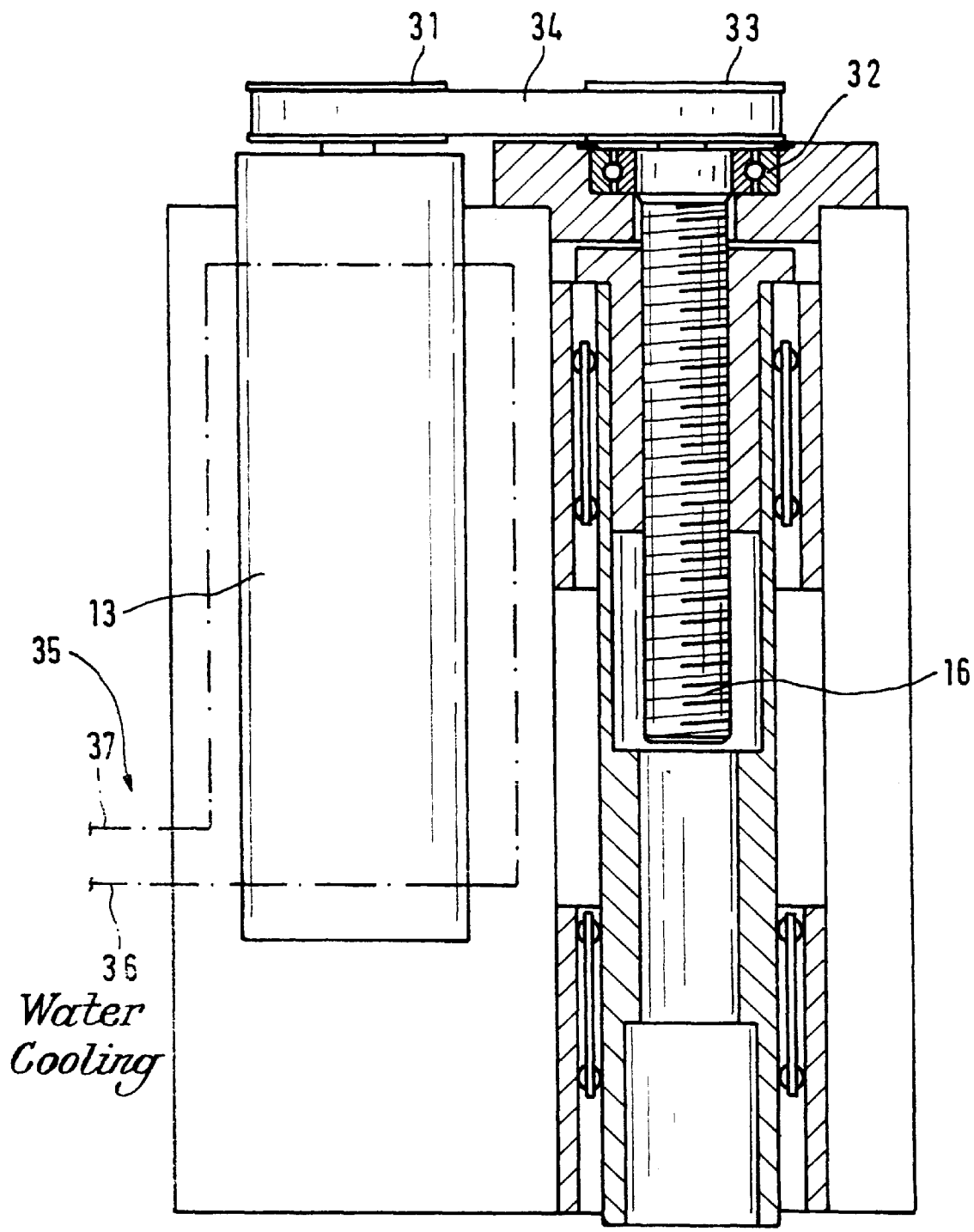

A parallel arrangement of the drive 13 and the drive spindle 16 is represented in FIG. 2, the same components being provided with the same reference numerals. The drive has in this respect a drive pinion 31, which is designed in the form of a belt pulley. The drive spindle 16, arranged parallel to the longitudinal axis of the drive 13 and alongside the drive 13, has a second belt pulley 33, mounted by means of ball bearings 32. The force transmission from the drive 13 to the drive spindle 16 takes place via a belt 34, which lies in the belt pulleys 31 and 33. The belt may be designed as a toothed-belt, V-belt or poly-V-belt drive. Other coupling elements 24 can be used between the drive and drive spindle. It is preferred for the drive 13 to be assigned a cooling system, by means of which higher motor efficiency is achieved. The cooling system is designed as water cooling, cooling water being fed in via inlet 36 and cooling water being discharged via outlet 37. It goes without saying that supercooled liquids or oil, or air may be used as the cooling liquid or gas.

Figure 3:
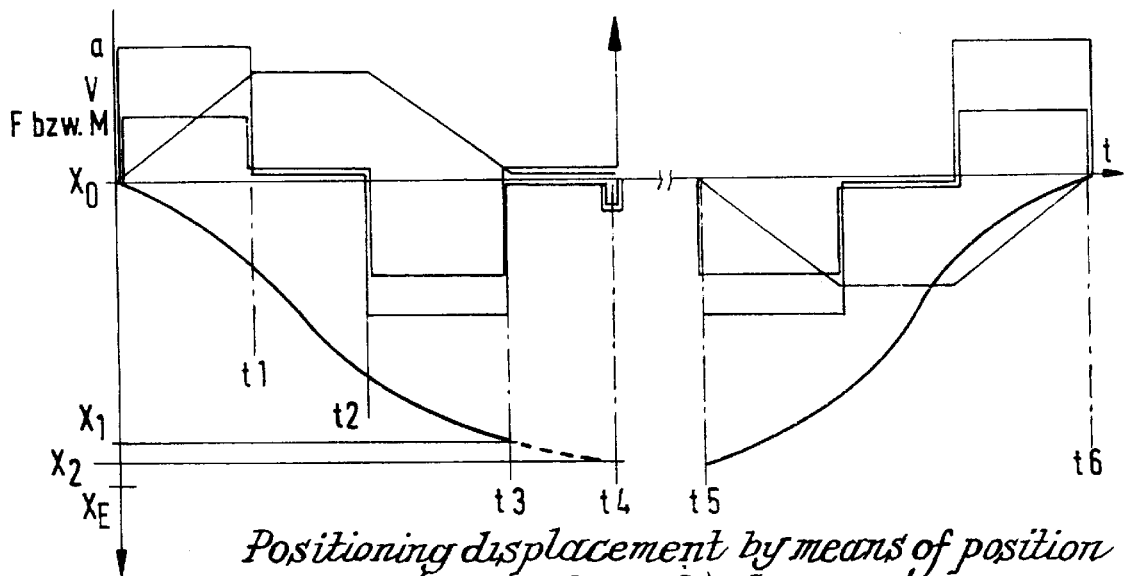

Represented in FIG. 3 is a program profile for the electrical welding drive 13, which performs a cycle with the following functions infeeding searching setting down applying pressure—welding 1st cycle moving on holding returning.

Infeeding (when $X<X_1$)

positioning by means of position control loop (17, 19, 27, 28) to position $X_1$ with maximum dynamics ($M_S$). The value X1 is previously determined from the welding process values and the geometrical data which are stored in the controller 15.

Searching (at $X_1$)

The drive 13 switches over automatically to the torque control loop (18, 29, 30, 20) and searches for the workpiece 14.

Setting down (at $X_2$)

The drive 13 sets down with a slight, defined force on the workpiece 14. Measurement of $dx/dt=o$ or $dw/dt=o$ provides the information on reaching the target. In the following sequence:

Applying pressure+welding (at $X_2/t_4$)

Increasing the pressing force to F max. (M. max.). Switching on of the welding current. Initiation of the moving-on operation.

Moving on in the welding operation (at $X_2$)

Two possible methods:

Force F or torque M controlled.

Measurements of the moving-on displacement $\Delta$ x.

Position control to x with M=M max. sharp control setting (PID ).

The welding current is switched off:

after reaching a maximum permissible $\Delta$ x or after a defined time.

Switching over to the next step:

Holding (at $X_2 - \Delta$ x)

This position is held for a defined time (position-controlled). Returning (at $t=t_5$)

Initiation of return by means of a switch. Position-controlled positioning to x=xo.

I claim:

1. A resistance forge welding machine comprising at least one welding head with an electrode at least one welding transformer for generating a welding current, which is connected to the electrode at least one drive for moving the electrode or for producing an electrode pressure on the workpiece and a controller, which is connected to the drive and to the welding transformer, in which machine there is a controllable electromotive drive, which has a drive spindle or toothed rack, wherein the drive has a displacement sensor and/or torque sensor, which are connected to a comparator.

2. A resistance forge welding machine comprising at least one welding head with an electrode at least one welding transformer for generating a welding current, which is connected to the electrode at least one drive for moving the electrode or for producing an electrode pressure on the workpiece and a controller, which is connected to the drive and to the welding transformer, in which machine there is a controllable electromotive drive, which has a drive spindle or toothed rack, wherein the comparators are provided in one of the controller and the drive.

3. A resistance forge welding machine comprising
   at least one welding head with an electrode
   at least one welding transformer for generating a welding current, which is connected to the electrode
   at least one drive for moving the electrode or for producing an electrode pressure on the workpiece
   and a controller, which is connected to the drive and to the welding transformer,
in which machine
there is a controllable electromotive drive, which has a drive spindle or toothed rack, wherein the comparators are connected to setpoint generators for the input of setpoint displacement values and setpoint torque values.

4. A resistance forge welding machine comprising
   at least one welding head with an electrode
   at least one welding transformer for generating a welding current, which is connected to the electrode
   at least one drive for moving the electrode or for producing an electrode pressure on the workpiece
   and a controller, which is connected to the drive and to the welding transformer,
in which machine
there is a controllable electromotive drive, which has a drive spindle or toothed rack, wherein the setpoint generators are connected to the controller.

5. A resistance forge welding machine comprising
   at least one welding head with an electrode
   at least one welding transformer for generating a welding current, which is connected to the electrode
   at least one drive for moving the electrode or for producing an electrode pressure on the workpiece
   and a controller, which is connected to the drive and to the welding transformer,
in which machine
there is a controllable electromotive drive, which has a drive spindle or toothed rack, wherein the controller has a control selected from the group consisting of a current and voltage and power and temperature control, wherein the drive spindle is connected to the welding head in such a way that, when the drive is in operation, the welding head moves into a predetermined position and, in the predetermined position, exerts a predetermined electrode pressure on the workpiece the drive has a displacement sensor and/or torque sensor, which are connected to a comparator the comparators are provided in one of the controller and the drive the comparators are connected to setpoint generators for the input of setpoint displacement values and setpoint torque values the setpoint generators are connected to the controller the drive is designed as a servo motor the drive and the drive spindle are arranged parallel alongside one another and are connected to one another via a coupling element the coupling element is a belt.

* * * * *